J. A. BENTZ.
TRACTION LUG.
APPLICATION FILED APR. 27, 1921.

1,400,514.

Patented Dec. 20, 1921.
2 SHEETS—SHEET 1.

Inventor
John A. Bentz,
By George G. Prevost
Attorney

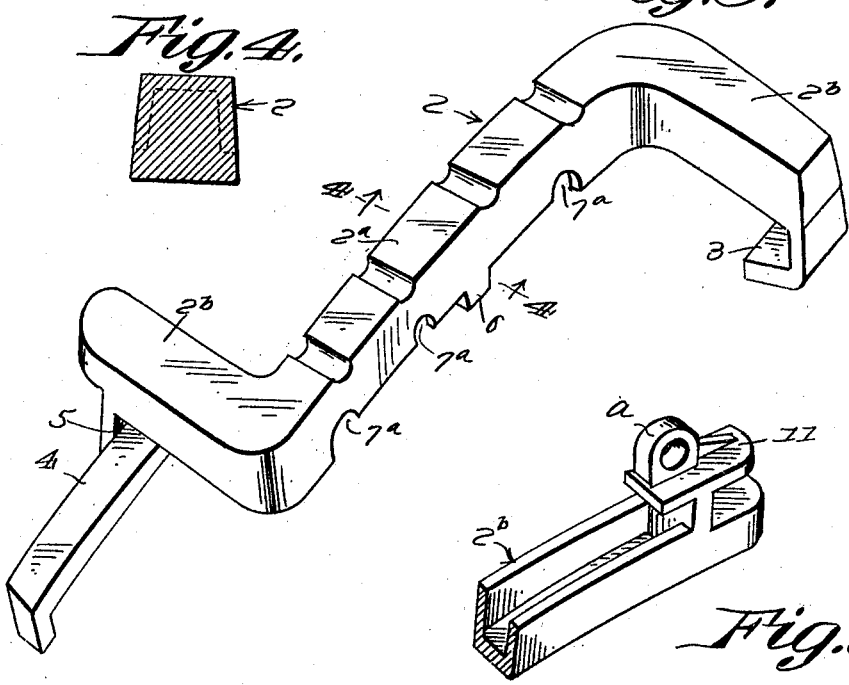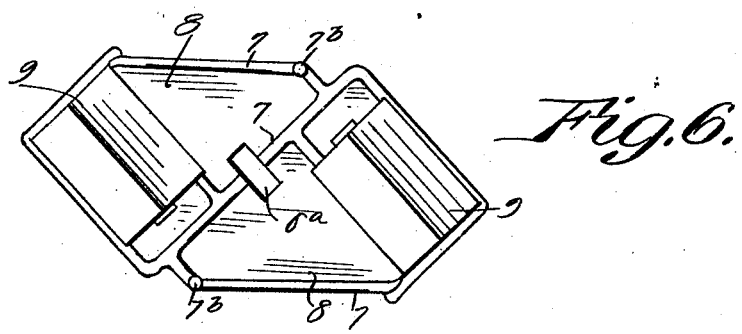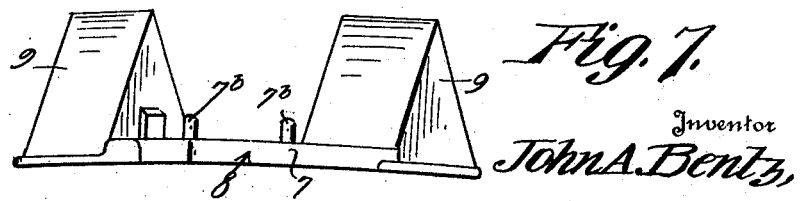

UNITED STATES PATENT OFFICE.

JOHN A. BENTZ, OF HARRISBURG, PENNSYLVANIA, ASSIGNOR OF ONE-HALF TO WALTER S. SCHELL AND ONE-HALF TO BESSIE M. BENTZ, BOTH OF HARRISBURG, PENNSYLVANIA.

TRACTION-LUG.

1,400,514.   Specification of Letters Patent.   Patented Dec. 20, 1921.

Application filed April 27, 1921. Serial No. 464,945.

*To all whom it may concern:*

Be it known that I, JOHN A. BENTZ, a citizen of the United States, residing at Harrisburg, in the county of Dauphin and State of Pennsylvania, have invented certain new and useful Improvements in Traction-Lugs; and I do hereby declare the following to be a full, clear, and exact description of the invention, such as will enable others skilled in the art to which it appertains to make and use the same.

My invention relates to wheels for tractors and similar machines, in the use of which it is desirable to increase the traction in some instances and to decrease it in others.

In my U. S. Letters Patent No. 1,369,955 I disclosed an invention which involves the application to the tread of the wheels of tractors or similar machines, of a set of removable lugs, by the use of which I may roughen the surface of the tread of the wheel, or the wheels may be allowed to present a smooth surface, as desired.

My present invention consists of certain novel and useful improvements upon the construction set up in my former patent, and contemplates the use of a supplemental removable lug, by which the traction may be greatly increased when desired, as for example, when the machine is required to operate in soft ground, the said lug being quickly and easily removed when its use is no longer necessary or desirable.

With the above and other objects in view, which will appear as the description proceeds, the invention consists in the novel features herein set forth, illustrated in the accompanying drawings and more particularly pointed out in the appended claims.

In describing my invention in detail, reference will be had to the accompanying drawings wherein like characters denote corresponding parts throughout the several views, and in which—

Figure 1 is a view showing the lugs on the rim of the wheel before the supplemental lugs are attached.

Fig. 1ᵃ is a view of the under side of a vehicle wheel rim, showing the means for connecting the main lugs.

Fig. 3 is a detail view of one of the main lugs.

Fig. 4 is a view taken on line 4—4 of Fig. 3.

Fig. 5 is a detail view of the end of the main locking lug.

Fig. 6 is a plan view of the supplemental lug and,

Fig. 7 is a front view thereof.

Figure 1:
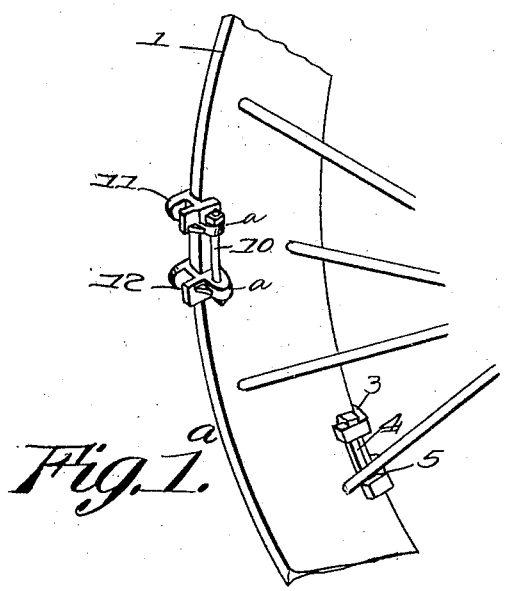
Figure 1:
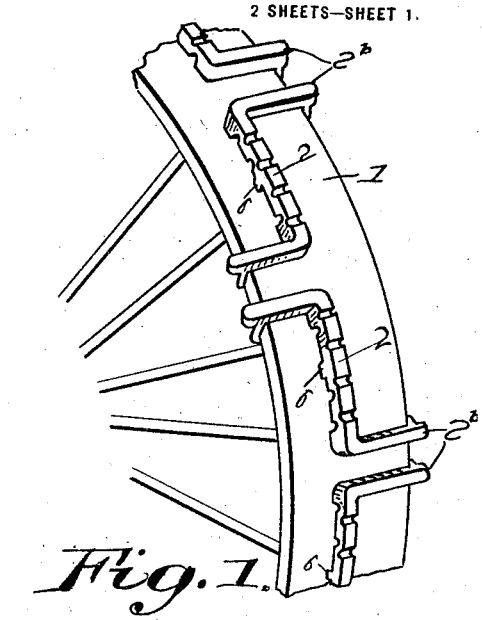

In the drawings, 1 indicates the rim of the wheel to which my improved main lugs 2 are adapted to be secured. These lugs are formed in pairs, each pair comprising a right and left lug. The main lugs each consist of a longitudinally extending portion 2ᵃ, provided with arms 2ᵇ oppositely disposed and extending at right angles to the main portion 2ᵃ.

These lugs, as set forth in my Patent No. 1,369,955 are provided with grooves 3 and 5 and a tongue 4, the groove 3 being larger than the groove 5 to permit the receiving of both the tongue 4 of an adjacent lug and the rim of the wheel. The tongue fits under the rim of the wheel and the groove 3 of the next lug receives the end of the said tongue, together with the rim of the wheel.

In this way each lug interlocks at each end with the adjacent lug, and also engages the rim of the wheel.

The abutting ends of the lugs 11 and 12 of the series are adjustably connected by a bolt 10.

Figure 2:
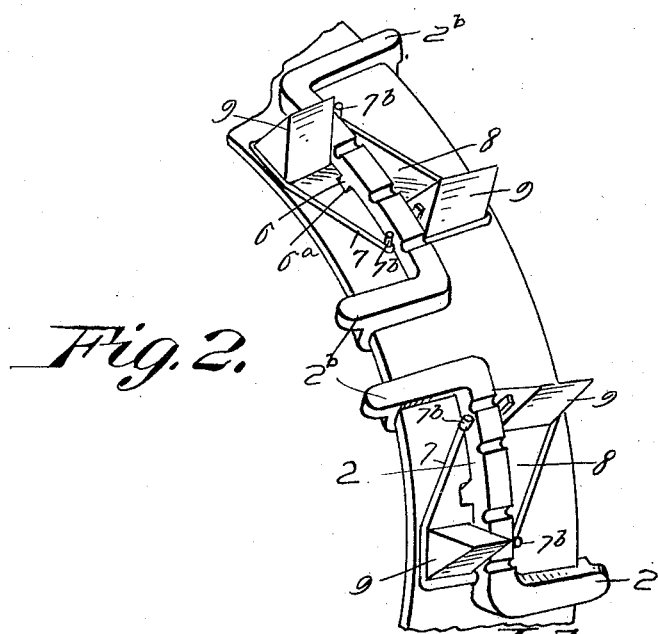
Fig. 2 is a view showing the supplemental lugs in place on the rim.

The supplemental lugs are designated by the numeral 8 and to correspond with the main lugs are made as rights and lefts. These lugs are provided with teeth 9, which take in the soft earth and supply means for greater traction. In the base of the lug 8, is a recess 6ᵃ which, when in place on the wheel, as shown in Fig. 2, receives the projection 6 on the main portion 2ᵃ of the main lug 2. In a like manner, the grooves 7ᵃ in the lug 2 receive the raised portion 7 on the base of the supplemental lug 8, and the lugs are held rigidly by the posts 7ᵇ. The main lugs 2 are hollowed on the under sides thereof, and receive the central rib 7 on the base of the supplemental lugs.

The supplemental lug, as shown in Fig. 7, is curved to conform to the shape of the periphery of the wheel, and is placed under the main lug, which serves to hold it in position.

It will be noted that the entire series of lugs and supplemental lugs is held in place by only the one bolt, shown at 10, in Fig. 1ᵃ.

If it is desirable to use the vehicle with the tread of the wheels presenting a smooth surface, as for example when running on the road, none of the lugs need be applied. If slight traction is desired, the series of lugs 2 may be applied, and if still greater traction is necessary, the lugs 2 may be removed, the lugs 8 placed upon the tread and secured in place by the series of lugs 2 and a single bolt and nut operating in connection with the ears *a* on the end lugs 11 and 12.

It is obvious that numerous changes may be made in the details of construction, without departing from the spirit of the invention.

From the foregoing description, it is thought that the advantages and novel features of my invention will be readily apparent.

What I claim and desire to secure by Letters Patent is:—

1. The combination with a wheel rim, of a series of traction lugs extending around the periphery of the same, each provided with means interlocking with the edge of the rim, each of said lugs having its ends detachably interlocking with the ends of adjacent lugs, and supplemental lugs interposed between the rim and said series of lugs.

2. The combination with a wheel rim, of a series of traction lugs extending around the periphery of the same, each provided with means interlocking with the edge of the rim, each of said lugs having its ends detachably interlocking with the ends of adjacent lugs and supplemental lugs removably interposed between the rim and said series of lugs.

3. The combination with a vehicle wheel, of a series of traction lugs interlocking with one another, said lugs consisting of a main portion which is provided with arms oppositely disposed and at right angles to the said main portion, and means for locking said lugs to the rim of the wheel and a supplemental lug secured to the wheel by said series of interlocking lugs.

4. The combination with a vehicle wheel rim, of a series of traction lugs extending around the periphery of the same, each provided with means interlocking with the edge of the rim, each of said lugs having its ends detachably interlocking with the ends of adjacent lugs, and supplemental lugs provided with teeth, which project radially beyond the main lugs.

5. The combination with a vehicle wheel, of a series of traction lugs interlocking with one another, means for locking said lugs to the rim of the wheel, and a supplemental lug provided with teeth, which extend radially beyond the main lug and on each side of the main portion thereof, said supplemental lug being secured to the wheel by the said series of interlocking lugs.

6. The combination with the rim of a vehicle wheel, of a supplemental lug comprising a base portion and a pair of teeth extending therefrom, and means consisting of interlocking main lugs for removably securing said lug to the rim.

7. The combination with a vehicle wheel, of a series of lugs interlocking with one another, each lug of the series comprising a main portion provided with arms oppositely disposed and at right angles to said main portion, each arm being provided with recesses and a tongue by means of which they are secured to the rim of the wheel and to each other, supplemental lugs comprising a base portion which is provided with a recess to receive a projection on the main portion of the main lug, triangular shaped teeth provided on the base of said supplemental lug and extending beyond the main lug and on each side of the main portion thereof.

In testimony whereof I affix my signature, in the presence of two witnesses.

JOHN A. BENTZ.

Witnesses:
SARAH Q. MALONEY,
JOHN H. MALONEY, Jr.